US012431610B2

(12) United States Patent
Li et al.

(10) Patent No.: US 12,431,610 B2
(45) **Date of Patent: *Sep. 30, 2025**

(54) COMMUNICATION DEVICE AND A METHOD IN A COMMUNICATION DEVICE

(71) Applicant: HUAWEI TECHNOLOGIES CO., LTD., Guangdong (CN)

(72) Inventors: Linsheng Li, Shenzhen (CN); Hanyang Wang, Reading (GB); Alexander Khripkov, Helsinki (FI); Dongxing Tu, Shenzhen (CN); Hongting Luo, Shanghai (CN); Zlatoljub Milosavljevic, Helsinki (FI)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/196,278

(22) Filed: May 11, 2023

(65) Prior Publication Data

US 2023/0282960 A1 Sep. 7, 2023

Related U.S. Application Data

(63) Continuation of application No. 16/956,475, filed as application No. PCT/EP2017/083832 on Dec. 20, 2017, now Pat. No. 11,664,581.

(51) Int. Cl.
*H01Q 1/22* (2006.01)
*H01Q 1/24* (2006.01)
(Continued)

(52) U.S. Cl.
CPC ........... *H01Q 1/2283* (2013.01); *H01Q 1/243* (2013.01); *H01Q 1/38* (2013.01); *H01Q 21/28* (2013.01); *H01Q 23/00* (2013.01)

(58) Field of Classification Search
CPC .......... H01Q 23/00; H01Q 21/28; H01Q 1/38; H01Q 1/243; H01Q 1/2283
See application file for complete search history.

(56) References Cited

U.S. PATENT DOCUMENTS

2010/0240327 A1* 9/2010 Lambrecht ............ H01Q 1/243 343/702
2014/0285378 A1 9/2014 Hong et al.
(Continued)

FOREIGN PATENT DOCUMENTS

CN 101809814 A 8/2010
CN 102393536 A 3/2012
(Continued)

OTHER PUBLICATIONS

3GPP TR 38.901 V14.2.0 (Sep. 2017), 3rd Generation Partnership Project; Technical Specification Group Radio Access Network;Study on channel model for frequencies from 0.5 to 100 GHZ (Release 14), total 91 pages.
(Continued)

*Primary Examiner* — Graham P Smith
(74) *Attorney, Agent, or Firm* — WOMBLE BOND DICKINSON (US) LLP

(57) ABSTRACT

A communication device comprising: a millimetre wave antenna arrangement comprising a distributed millimetre wave antenna radiating element and a corresponding fixed millimetre wave antenna radiating element; a Radio Frequency Integrated Circuit; wherein the fixed millimetre wave antenna radiating element is arranged together with the Radio Frequency Integrated Circuit on a first substrate; wherein the distributed millimetre wave antenna radiating element is arranged on at least one second substrate spaced apart from the first substrate; and a switching arrangement configured to selectively connect either the fixed millimetre wave antenna radiating element to the Radio Frequency
(Continued)

Integrated Circuit or the distributed millimetre wave antenna radiating element to the Radio Frequency Integrated Circuit. An associated method in a communication device, and an associated computer program product.

23 Claims, 4 Drawing Sheets

(51) Int. Cl.

| | |
|---|---|
| ***H01Q 1/38*** | (2006.01) |
| ***H01Q 21/28*** | (2006.01) |
| ***H01Q 23/00*** | (2006.01) |

(56) References Cited

U.S. PATENT DOCUMENTS

| | | | |
|---|---|---|---|
| 2015/0116169 | A1 | 4/2015 | Ying et al. |
| 2016/0087348 | A1 | 3/2016 | Ko et al. |
| 2016/0093939 | A1 | 3/2016 | Kim et al. |
| 2016/0134323 | A1 | 5/2016 | Bengtsson et al. |
| 2016/0172761 | A1 | 6/2016 | Garcia et al. |
| 2016/0308563 | A1 | 10/2016 | Ouyang et al. |
| 2017/0012359 | A1 | 1/2017 | Jung et al. |
| 2017/0110787 | A1 | 4/2017 | Ouyang et al. |
| 2017/0214121 | A1 | 7/2017 | Ganchrow et al. |
| 2018/0026341 | A1 | 1/2018 | Mow et al. |
| 2019/0207323 | A1 | 7/2019 | Joung et al. |

FOREIGN PATENT DOCUMENTS

| | | | |
|---|---|---|---|
| CN | 103178345 | A | 6/2013 |
| CN | 104275698 | A | 1/2015 |
| CN | 106684575 | A | 5/2017 |
| CN | 107534223 | A | 1/2018 |
| CN | 108496276 | A | 9/2018 |
| DE | 202017003830 | U1 | 11/2017 |
| WO | 2017132373 | A1 | 8/2017 |

OTHER PUBLICATIONS

R4-1711036 Samsung et al.,"Consideration of EIRP spherical coverage requirement",3GPP TSG-RAN WG4 Meeting #84-Bis,Dubrovnik, Croatia, 09 Oct. 13, 2017,total 3 pages.

* cited by examiner

COMMUNICATION DEVICE AND A METHOD IN A COMMUNICATION DEVICE

CROSS-REFERENCE TO RELATED APPLICATIONS

This application is a continuation of U.S. patent application Ser. No. 16/956,475, filed on Jun. 19, 2020, which is a National stage of International Application No. PCT/EP2017/083832, filed on Dec. 20, 2017, both of which are hereby incorporated by reference in their entireties.

TECHNICAL FIELDS

Aspects of the present invention relate to a communication device comprising a millimetre wave antenna arrangement. Aspects of the present invention also relate to a method in a communication device. Further, aspects of the present invention relate to a computer program.

BACKGROUND OF THE INVENTION

In the fifth-generation millimetre wave mobile communication, the radio application requires the use of antenna arrays with multiple radiating elements to meet the requirements of high gain and beam forming. In general, the antenna array is integrated into a module or package together with the Radio Frequency Integrated Circuit (RFIC), or a uniform array is placed at the edges of the communication device. According to the 3GPP definition of performance parameters for the fifth generation (5G) New Radio (NR) User Equipment (UE) beam-forming, the 5G UE shall use omni-coverage millimetre wave antennas to achieve stable communication in all directions and orientations. By “omni-coverage” is meant that an antenna radiates equally well in all directions. It is difficult to provide omni-coverage for 5G UE due to the limited space in the UE.

SUMMARY

It has been found by the inventors that the millimetre wave radiation can be easily blocked by the human body, e.g. the hand and/or head. An improved millimetre wave antenna for a mobile device such as a UE is thus required.

An object of the embodiments of the invention is thus to provide an improved millimetre wave antenna arrangement for a mobile device (or communication device).

Another object of the embodiments of the invention is to counteract the effect of the human body’s blocking of the millimetre wave radiation.

According to various embodiments, at least one of the above-mentioned objects of the present invention is attained by providing a communication device comprising:

a millimetre wave antenna arrangement comprising a distributed millimetre wave antenna radiating element and a corresponding fixed millimetre wave antenna radiating element;

a Radio Frequency Integrated Circuit;

wherein the fixed millimetre wave antenna radiating element is arranged together with the Radio Frequency Integrated Circuit on a first substrate;

wherein the distributed millimetre wave antenna radiating element is arranged on at least one second substrate spaced apart from the first substrate; and a switching arrangement configured to selectively connect either the fixed millimetre wave antenna radiating element to the Radio Frequency Integrated Circuit or the distributed millimetre wave antenna radiating element to the Radio Frequency Integrated Circuit.

Embodiments of the present invention can improve the antenna coverage performance of the millimetre wave antenna arrangement and can counteract the influence of the human body effect which is caused by a user’s body (e.g. hands or head) blocking antenna elements of a mobile device. In alternative wording, the radiation coverage is expanded, and the human body effect is reduced. When the human body, e.g. a hand, blocks a fixed millimetre wave antenna radiating element, the switching arrangement can disconnect the blocked fixed millimetre wave antenna radiating element and instead connect a distributed millimetre wave antenna radiating element to the RFIC. Further, the total power consumption will not increase or not significantly increase. Hence, the embodiments of the present invention, an improved millimetre wave antenna arrangement with improved omni-coverage is provided.

In one embodiment, the communication device comprises a housing accommodating the millimetre wave antenna arrangement, the Radio Frequency Integrated Circuit, the switching arrangement and a processing unit, wherein the Radio Frequency Integrated Circuit is connected to the processing unit. An advantage with this implementation form is that an improved millimetre wave antenna arrangement for a communication device is provided.

In one embodiment, the processing unit comprises a baseband processor on a main Printed Circuit Board. The main Printed Circuit Board may be spaced apart from the first and second substrates. Consequently, the baseband processor may be spaced apart from the first and second substrates. An advantage with this implementation form is that the flexibility of the antenna arrangement is further improved.

In one embodiment, the millimetre wave antenna arrangement comprises a plurality of distributed millimetre wave antenna radiating elements including the distributed millimetre wave antenna radiating element, and a plurality of corresponding fixed millimetre wave antenna radiating elements including the fixed millimetre wave antenna radiating element. The plurality of distributed millimetre wave antenna radiating elements may be at least two distributed millimetre wave antenna radiating elements. The plurality of corresponding fixed millimetre wave antenna radiating elements may be at least two corresponding fixed millimetre wave antenna radiating elements. By having at least two distributed millimetre wave antenna radiating elements and at least two fixed millimetre wave antenna radiating elements, the flexibility and efficiency in transmitting and receiving signals to/from a base station is further improved. Advantageously, the switching arrangement is arranged to control the number of distributed millimetre wave antenna radiating elements and the number of fixed millimetre wave antenna radiating elements connected to the RFIC. An advantage with this implementation form is that the flexibility of the antenna arrangement is further improved. Further, the millimetre wave omni-coverage of the communication device is further assured.

In one embodiment, the millimetre wave antenna arrangement comprises a plurality of second substrates including the at least one second substrate, the second substrates being spaced apart from one another, and each second substrate is provided with at least one distributed millimetre wave antenna radiating element. An advantage with this implementation form is that the flexibility and efficiency of the antenna arrangement is further improved.

In one embodiment, each distributed millimetre wave antenna radiating element is connected to the switching arrangement by a flexible transmission line. An advantage with this implementation form is that the flexibility and efficiency of the antenna arrangement is further improved.

In one embodiment, the switching arrangement comprises a plurality of switches, wherein each switch is configured to connect a distributed millimetre wave antenna radiating element to the Radio Frequency Integrated Circuit while disconnecting a fixed millimetre wave antenna radiating element from the Radio Frequency Integrated Circuit, and each switch is configured to disconnect a distributed millimetre wave antenna radiating element from the Radio Frequency Integrated Circuit while connecting a fixed millimetre wave antenna radiating element to the Radio Frequency Integrated Circuit. An advantage with this implementation form is that a further efficient switching arrangement is provided, providing a further improved communication device.

In one embodiment, the Radio Frequency Integrated Circuit comprises a plurality of Radio Frequency channels, wherein each Radio Frequency channel is connected to a switch of the switching arrangement. An advantage with this implementation form is that a further efficient switching arrangement is provided, providing a further improved communication device.

In one embodiment, the switching arrangement is arranged on the first substrate. An advantage with this implementation form is that the switching arrangement is close to the Radio Frequency Integrated Circuit, providing a compact and efficient antenna solution for the communication device.

In one embodiment, the communication device comprises a plurality of Radio Frequency Integrated Circuits, wherein the communication device comprises at least one module, each module comprising a millimetre wave antenna arrangement, a Radio Frequency Integrated Circuit and a switching arrangement. An advantage with this implementation form is that the assembly of the communication device is facilitated.

In one embodiment, the communication device comprises a plurality of modules including the at least one module. An advantage with this implementation form is that the assembly of the communication device is further facilitated.

In one embodiment, the housing comprises a front, a back cover and a surrounding frame which mounts the back cover to the front, wherein the surrounding frame has four corners, wherein the first substrate of a first module is located at a first corner whereas the at least one second substrate of the first module is spaced apart from the first corner. An advantage with this implementation form is that a good antenna coverage performance is provided.

In one embodiment, the at least one second substrate of the first module is arranged adjacent to the surrounding frame. An advantage with this implementation form is that a good antenna coverage performance is provided.

In one embodiment, the first substrate of a second module is located at a second corner diagonally opposite the first corner, whereas the at least one second substrate of the second module is spaced apart from the second corner and arranged adjacent to the surrounding frame. An advantage with this implementation form is that a good antenna coverage performance is provided, and the human body effect can be counteracted in an efficient manner.

It is to be understood that the first and second modules and their parts may be arranged in other suitable ways.

In one embodiment, the processing unit is configured to control the switching arrangement to connect a distributed millimetre wave antenna radiating element and disconnect a fixed millimetre wave antenna radiating element when a change of a user scenario is detected. An advantage with this implementation form is that a good antenna coverage performance is provided, and the human body effect can be counteracted in an efficient manner.

In one embodiment, the change of the user scenario is the blocking of the fixed millimetre wave antenna radiating element by the user's hand or body, which may be called the human body effect. An advantage with this implementation form is that a further improved antenna coverage performance is provided, and the human body effect can be further counteracted in an efficient manner.

In one embodiment, the change of the user scenario is the change of the orientation of the fixed millimetre wave antenna radiating element in relation to a base station antenna to which the communication device connects. An advantage with this implementation form is that a further improved antenna coverage performance is provided.

According to various embodiments, at least one of the above-mentioned objects of the present invention is attained by providing a method for a communication device, comprising:

Connecting a fixed millimetre wave antenna radiating element which is arranged on the same substrate as a Radio Frequency Integrated Circuit to the Radio Frequency Integrated Circuit;

Detecting a change of a user scenario;

Disconnecting the fixed millimetre wave antenna radiating element from the Radio Frequency Integrated Circuit and connecting a corresponding distributed millimetre wave antenna radiating element which is arranged on a separate substrate as the Radio Frequency Integrated Circuit to the Radio Frequency Integrated Circuit.

By this method, a further improved antenna coverage performance is provided, and the effect of the human body's blocking of the millimetre wave radiation can be counteracted.

According various embodiments, at least one of the above-mentioned objects of the present invention is attained by providing at least one computer program with a program code for performing a method according to the second aspect of the invention when the computer program runs on a computer or processing unit.

Embodiments of the invention also relate to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

"Arranged on" is to be understood as mounted on, formed onto or attached to the respective substrate or board etc. By "spaced apart from" is meant that two, or more, entities or units are separated from one another, i.e. a distance is formed between the two entities. However, they may still be electrically connected, directly or indirectly, to one another. By "connected" is meant that two connected units can be electrically connected directly to one another, e.g. via an electrically conductive path, or indirectly connected/coupled to one another through some electrical means, for example a transformer or capacitor.

The above-mentioned features and implementations, respectively, may be combined in various possible ways providing further advantageous implementations. Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

The communication device 102, 202, 302 herein disclosed may be denoted as a user device, a User Equipment (UE), a mobile station, an internet of things (IoT) device, a sensor device, a wireless terminal and/or a mobile terminal, enabled to communicate wirelessly in a wireless communication system, sometimes also referred to as a cellular radio system and especially a LTE or New Radio (NR/5G) radio system. The UEs may further be referred to as mobile telephones or cellular telephones with wireless capability. The UEs in the present context are for example portable, pocket-storable, hand-held, computer-comprised enabled to communicate voice and/or data, via the radio access network, with another entity, such as another receiver or a server.

Figure 1:
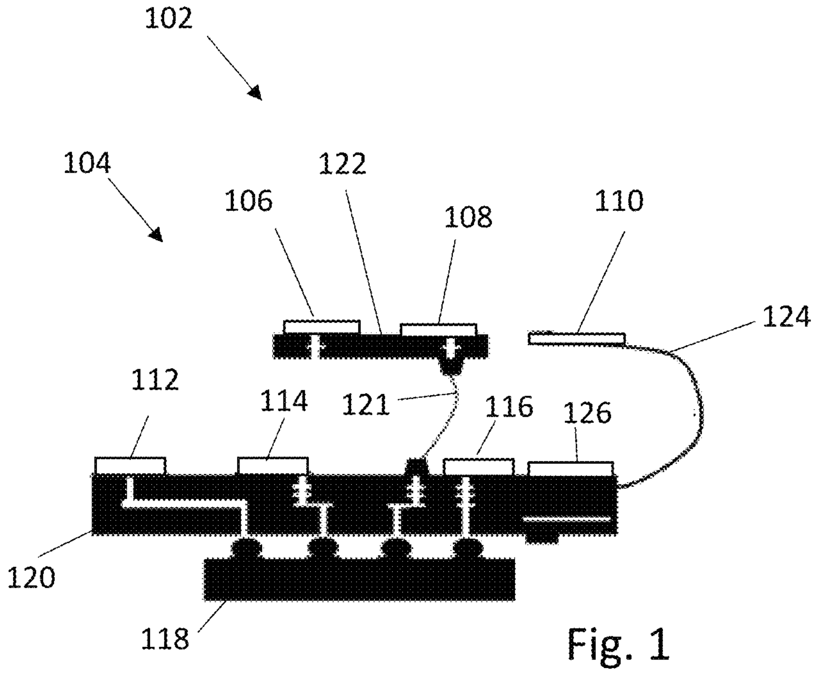
FIG. 1 is a schematic view of an embodiment of the communication device according to an embodiment of the present invention with the communication device housing excluded.

FIG. 1 schematically illustrates aspects of the communication device 102. The communication device 102 includes a millimetre wave antenna arrangement 104. The millimetre wave antenna arrangement 104 includes three distributed millimetre wave antenna radiating elements 106, 108, 110 and three corresponding fixed millimetre wave antenna radiating elements 112, 114, 116. However, the millimetre wave antenna arrangement could also include only one distributed millimetre wave antenna radiating element and only one fixed millimetre wave antenna radiating element. The number of distributed millimetre wave antenna radiating elements and fixed millimetre wave antenna radiating elements can be chosen in dependence on the desired application. The communication device further comprises a Radio Frequency Integrated Circuit, RFIC, 118. The fixed millimetre wave antenna radiating elements 112, 114, 116 are arranged together with the RFIC 118 on a first substrate 120. In this embodiment the RFIC 118 and the fixed millimetre wave antenna radiating elements 112, 114, 116 are arranged on opposite sides of the common first substrate 120. Two of the distributed millimetre wave antenna radiating elements 106, 108 are arranged on a second substrate 122 spaced apart from the first substrate 120. The third distributed millimetre wave antenna radiating element 110 is arranged on another second substrate 124 spaced apart from the first substrate 118 and the second substrate 122. The first substrate 120 and the second substrate 122 are rigid, whereas the other second substrate 124 is a flexible substrate, e.g. a Flexible Printed Circuit, FPC. The second substrate 122 may be connected to the first substrate 120 by means of a flexible transmission line 121, e.g. an Intermediate Frequency, IF, cable. Further, the communication device 102 includes a switching arrangement 126 configured to selectively connect either the fixed millimetre wave antenna radiating element 112, 114, 116 to the RFIC 118 or the distributed millimetre wave antenna radiating element 106, 108, 110 to the RFIC 118. Each substrate 120, 122 may be a dielectric substrate. In this embodiment, the switching arrangement 126 is arranged on the first substrate 120.

Figure 2:
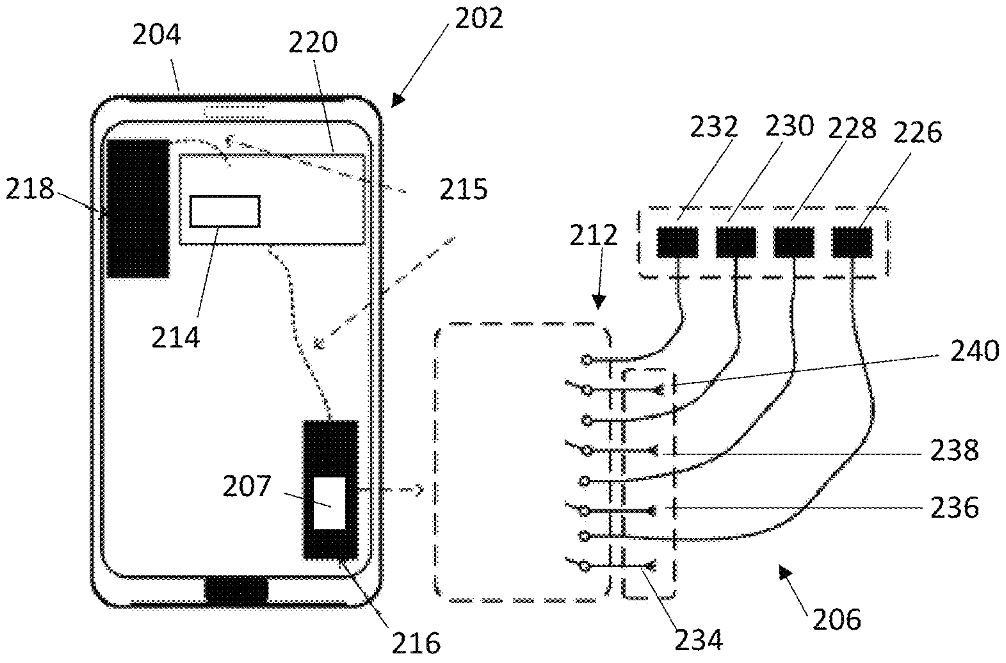
FIG. 2 is a schematic illustration of an embodiment of the communication device according an embodiment of to the present invention.

With reference to FIG. 2, the communication device 202 further comprises a housing 204. The housing 204 accommodates the millimetre wave antenna arrangement 206, the RFIC 207, the switching arrangement 212 and a processing unit 214, wherein the RFIC 207 is connected to the processing unit 214 via a cable 215, e.g. an IF cable. The communication device 202 comprises at least one module. In the embodiment of FIG. 2, the communication device 202 comprises two modules 216, 218. Each module 216, 218 includes a millimetre wave antenna arrangement 206, an RFIC 207 and a switching arrangement 212. The processing unit 214 may comprise a baseband processor (not shown) on a main Printed Circuit Board, PCB 220. The processing unit 214 is configured to control the switching arrangement 212 of each module 216, 218 to connect a distributed millimetre wave antenna radiating element 226 and disconnect a fixed millimetre wave antenna radiating element 234 when a change of a user scenario is detected and vice versa. The change of the user scenario may be the blocking of the fixed millimetre wave antenna radiating element 234 by the user's hand or body. However, the change of the user scenario may also be the change of the orientation of the fixed millimetre wave antenna radiating element 234 in relation to a base station antenna to which the communication device 202 connects. In the example of FIG. 2, each millimetre wave antenna arrangement 206 comprises four distributed millimetre wave antenna radiating elements 226, 228, 230, 232 and four corresponding fixed millimetre wave antenna radiating elements 234, 236, 238, 240. The fixed millimetre wave antenna radiating elements 234, 236, 238, 240 are provided on the first substrate. The distributed millimetre wave antenna radiating elements 226, 228, 230, 232 are provided on at least one second substrate. The main PCB 220 is separated from the first and second modules 216, 218, and thus also separated from first substrate and the second substrates.

Figure 3:
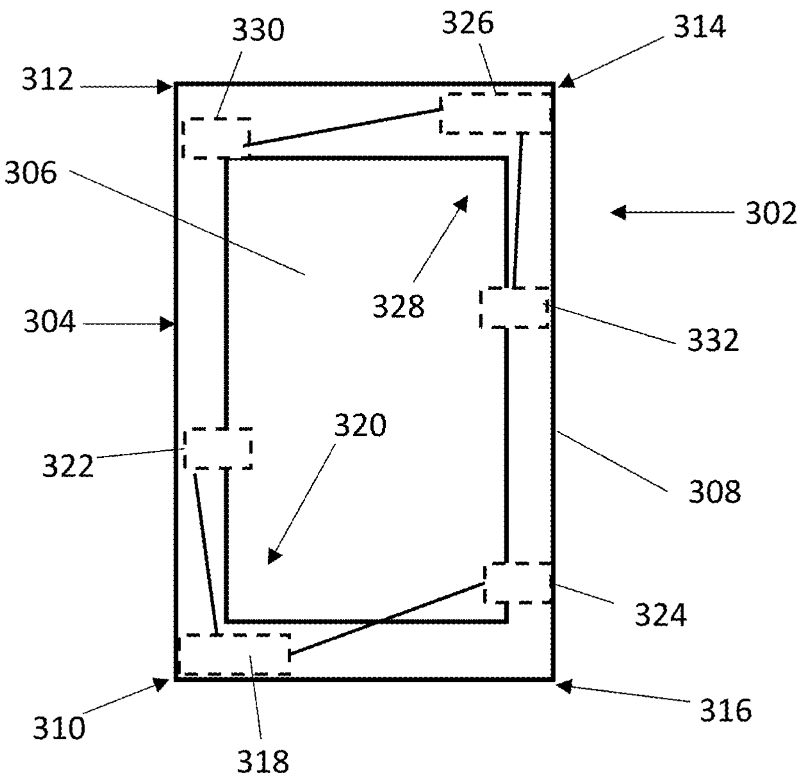
FIG. 3 is schematic illustration of an embodiment of the communication device according to an embodiment of the present invention.

With reference to FIG. 3, an example of the arrangement of the modules including distributed and fixed millimetre wave antenna radiating element is schematically illustrated. The housing 304 of the communication device 302 comprises a front 306, a back cover (not shown) and a surrounding frame 308 which mounts the back cover to the front 306. The surrounding frame 308 has four corners 310, 312, 314, 316. The first substrate 318 of a first module 320 is located at a first corner 310 whereas the two second substrates 322, 324 of the first module 320 are spaced apart from the first corner 310, but are connected, e.g. by an FPC, to the first substrate 318. The first substrate 326 of a second module 328 is located at a second corner 314, whereas the two second substrates 330, 332 of the second module 328 are spaced apart from the second corner 314, but are connected to the first substrate 326 of the second module 328, e.g. by an FPC. The second substrates 322, 324, 330, 332 of the first and second modules 320, 328 are arranged adjacent to the surrounding frame 308, and can be placed on either the display side/front 306 or on the backside of the communication device 302. The first substrate 326 of the second module 328 is located at a corner 314 diagonally opposite the first corner 310. Each second substrate 322, 324, 330, 332 includes a plurality of distributed millimetre wave antenna radiating elements. Each first substrate 318, 326 includes at least one RFIC and a plurality of fixed millimetre wave antenna radiating elements. It is to be understood that other locations of the modules are possible. The first substrates of the first module and the second module, respectively, may e.g. be placed in two adjacent corners of the communication device. Placing the first substrate of a module close to a side or a corner is advantageous because of a lower risk of blockage of the antenna elements by the user's hands or head.

Figure 4A:
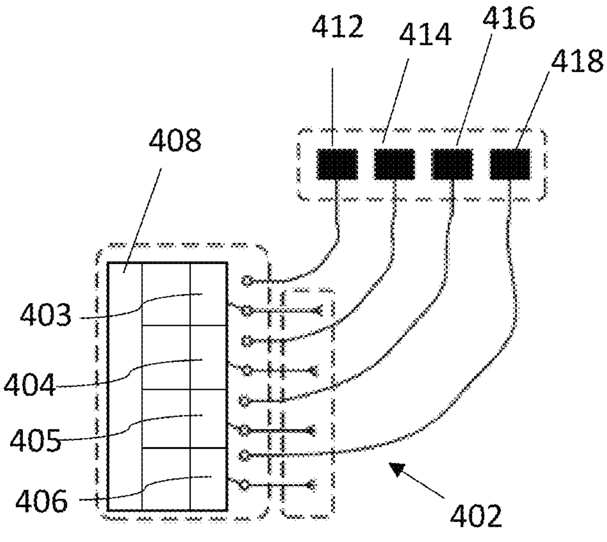
FIGS. 4*a*-4*c* are schematic block diagrams illustrating an embodiment of the communication device according to an embodiment of the present invention.
Figure 4B:
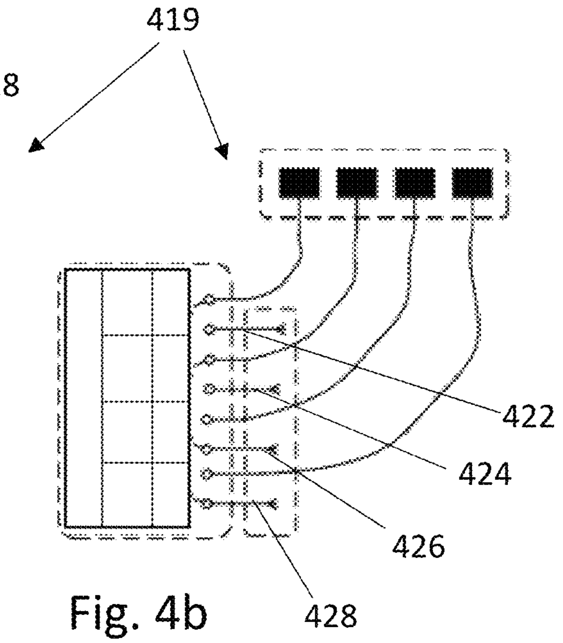
Figure 4C:
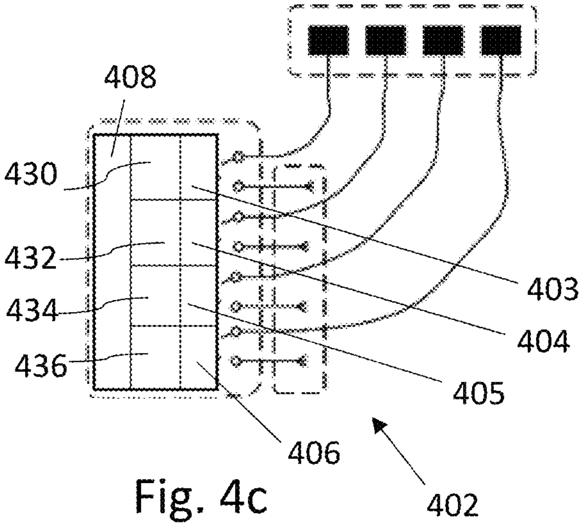

FIGS. 4*a*-4*c* schematically illustrate the switching in an embodiment of the communication device. The switching arrangement 402 comprises a plurality of switches 403, 404, 405, 406. Each switch 403, 404, 405, 406 is configured to connect a corresponding distributed millimetre wave antenna radiating element 412, 414, 416, 418 of the millimetre wave antenna arrangement 419 to the RFIC 408 while disconnecting a corresponding fixed millimetre wave antenna radiating element 422, 424, 426, 428 of the millimetre wave antenna arrangement 419 from the RFIC 408. Vice versa, each switch 403, 404, 405, 406 is configured to disconnect a corresponding distributed millimetre wave antenna radiating element 412, 414, 416, 418 from the RFIC 408 while connecting a corresponding fixed millimetre wave antenna radiating element 422, 424, 426, 428 to the RFIC 408. Hence, for each pair of fixed and distributed millimetre wave antenna radiating element a corresponding switch is provided.

With reference to FIG. 4*a*, all four fixed millimetre wave antenna radiating elements 422, 424, 426, 428 are connected to the RFIC 408, whereas all four distributed millimetre wave antenna radiating element 412, 414, 416, 418 are disconnected from the RFIC 408. This can be considered as a starting point of a switching scenario sequence, when the user has the communication device in his pocket and is called up. The user grabs the communication device with his right hand to answer the call and then holds the communication device next to his head.

When the user is talking into the communication device, the processing unit 214 receives information that two fixed millimetre wave antenna radiating elements 422, 424 are blocked. The two fixed millimetre wave antenna radiating elements 422, 424 may be blocked by the user's head or hand. Thus, the processing unit 214 controls the switching arrangement 402 to disconnect said fixed millimetre wave antenna radiating elements 422, 424 from the RFIC 408 and instead to connect two distributed millimetre wave antenna radiating element 412, 414 to the RFIC 408. This scenario is shown in FIG. 4*b*, where two fixed millimetre wave antenna radiating elements 426, 428 are still connected to the RFIC 408, and two distributed millimetre wave antenna radiating elements 416, 418 are still disconnected from the RFIC 408.

When the user ends the conversation and hangs up, he grabs the communication device with his both hands to watch a video or read something on the screen of the communication device. The processing unit 214 receives information that the two fixed millimetre wave antenna radiating elements 426, 428, which still are connected, are blocked. The two fixed millimetre wave antenna radiating elements 426, 428 may be blocked by the user's hands. Thus, the processing unit 214 controls the switching arrangement 402 to disconnect said remaining fixed millimetre wave antenna radiating elements 426, 428 from the RFIC 408 and instead to connect two distributed millimetre wave antenna radiating element 416, 418 to the RFIC 408. This scenario is shown in FIG. 4*c*, where all four fixed millimetre wave antenna radiating elements 422, 424, 426, 428 now are disconnected from the RFIC 408, whereas all four distributed millimetre wave antenna radiating element 412, 414, 416, 418 are connected to the RFIC 408. It is to be understood that alternative switching scenarios and alternative millimetre wave antenna arrangements are possible. With reference to FIG. 4*c*, the RFIC 408 may comprise a plurality of Radio Frequency, RF, channels 430, 432, 434, 436. Each RF channel 430, 432, 434, 436 is connected to a switch 403, 404, 405, 406 of the switching arrangement 402.

With reference to FIGS. 4*a*-4*c*, the millimetre wave antenna arrangement may, e.g., comprise fewer or more fixed millimetre wave antenna radiating elements compared to FIGS. 4*a*-4*c*. The millimetre wave antenna arrangement may comprise fewer or more distributed millimetre wave antenna radiating elements compared to FIGS. 4*a*-4*c*. The number of switches of the switching arrangement 402 can be chosen accordingly.

Figure 5:
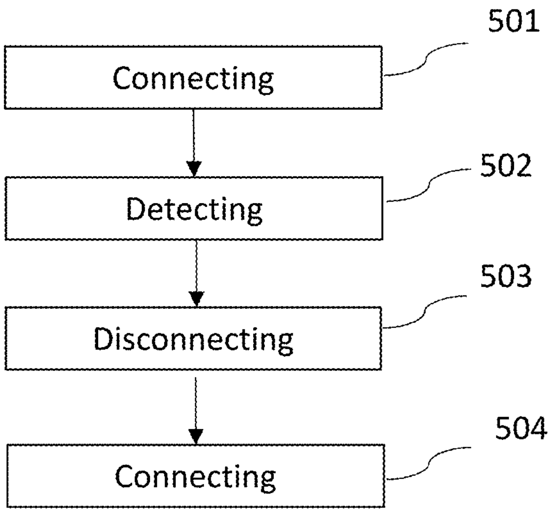
FIG. 5 is a schematic diagram illustrating aspects of the method according to an embodiment of the present invention.

With reference to FIG. 5, a schematic diagram illustrates aspects of the method according to the invention. The method in the communication device comprises the operations of:

Connecting, 501, a fixed millimetre wave antenna radiating element which is arranged on the same substrate as a RFIC to the RFIC;

Detecting, 502, a change of a user scenario (which can be a scenario disclosed above);

Disconnecting, 503, the fixed millimetre wave antenna radiating element from the RFIC and connecting, 504, a corresponding distributed millimetre wave antenna radiating element which is arranged on a separate substrate as the RFIC to the RFIC.

Provided is also at least one computer program product directly loadable into the internal memory of at least one digital computer or processing unit, comprising software code portions for performing the operations of the above-mentioned method when the product is/are run on the computer or processing unit.

It is to be understood that the millimetre wave antenna arrangement may include a plurality of distributed millimetre wave antenna radiating elements including the distributed millimetre wave antenna radiating element. It is to be understood that the millimetre wave antenna arrangement may include a plurality of corresponding fixed millimetre wave antenna radiating elements including the fixed millimetre wave antenna radiating element. It is to be understood that the millimetre wave antenna arrangement may include a plurality of second substrates including the at least one second substrate, the second substrates being spaced apart from one another. Each second substrate may be provided with at least one distributed millimetre wave antenna radiating element.

The fixed millimetre wave antenna radiating elements may be have a broadside radiation pattern and/or an end-fire radiation pattern.

Each of the above-mentioned antenna radiating elements may e.g. be a patch antenna, a printed antenna, a dipole antenna or a slot antenna etc. Different mixtures of the mentioned antenna versions, and others, are possible.

The features of the different embodiments of the communication device, method and the at least one computer program disclosed above may be combined in various possible ways providing further advantageous embodiments.

Finally, it should be understood that the invention is not limited to the embodiments described above, but also relates to and incorporates all embodiments within the scope of the appended independent claims.

What is claimed is:

1. A communication device, comprising:
- a millimetre wave antenna arrangement comprising at least one distributed millimetre wave antenna radiating element and a fixed millimetre wave antenna radiating element, wherein the at least one distributed millimetre wave antenna radiating element comprises a first distributed millimetre wave antenna radiating element;
- a Radio Frequency Integrated Circuit;
- a first flexible transmission line;
- a first substrate, wherein the first substrate is a rigid substrate, the fixed millimetre wave antenna radiating element and the Radio Frequency Integrated Circuit are arranged on the first substrate;
- a second substrate, spaced apart from the first substrate, the second substrate is connected directly to the first substrate by the first flexible transmission line, wherein the first distributed millimetre wave antenna radiating element is arranged on the second substrate; and
- a housing, comprises a front, a back cover and a surrounding frame which mounts the back cover to the front, wherein the millimetre wave antenna arrangement, the Radio Frequency Integrated Circuit, the first substrate, the second substrate and the first flexible transmission line are arranged in the housing,
- wherein the Radio Frequency Integrated Circuit is configured to be connected to at least one of the fixed millimetre wave antenna radiating element or the at least one distributed millimetre wave antenna radiating element.

2. The communication device according to claim 1, further comprising:
- a switching arrangement, configured to selectively connect the Radio Frequency Integrated Circuit to at least one of the fixed millimetre wave antenna radiating element or the at least one distributed millimetre wave antenna radiating element,
- wherein based on the switching arrangement connecting the first distributed millimetre wave antenna radiating element to the Radio Frequency Integrated Circuit, the first distributed millimetre wave antenna radiating element is connected to the Radio Frequency Integrated Circuit by the first flexible transmission line.

3. The communication device according to claim 2, further comprising:
- a main Printed Circuit Board, wherein a processing unit comprising a baseband processor fixed on the main Printed Circuit Board,
- wherein the processing unit is configured to control the switching arrangement to connect the Radio Frequency Integrated Circuit to at least one of the fixed millimetre wave antenna radiating element or the at least one distributed millimetre wave antenna radiating element.

4. The communication device according to claim 3, wherein the main Printed Circuit Board is spaced apart from the first substrate and the second substrate.

5. The communication device according to claim 2, wherein the switching arrangement is configured to connect the first distributed millimetre wave antenna radiating element to the Radio Frequency Integrated Circuit and to disconnect the fixed millimetre wave antenna radiating element from the Radio Frequency Integrated Circuit.

6. The communication device according to claim 2, wherein the switching arrangement is configured to disconnect the first distributed millimetre wave antenna radiating element from the Radio Frequency Integrated Circuit and to connect the fixed millimetre wave antenna radiating element to the Radio Frequency Integrated Circuit.

7. The communication device according to claim 2, wherein the switching arrangement is arranged on the first substrate.

8. The communication device according to claim 1, wherein the first flexible transmission line is configured to transmit radio frequency signal between the Radio Frequency Integrated Circuit arranged on the first substrate and the first distributed millimetre wave antenna radiating element arranged on the second substrate.

9. The communication device according to claim 1, wherein the fixed millimetre wave antenna radiating element and the Radio Frequency Integrated Circuit are fixed on opposite sides of the first substrate, wherein at least part of the fixed millimetre wave antenna radiating element is fixed directly opposite the Radio Frequency Integrated Circuit.

10. The communication device according to claim 1, wherein
- the communication device further comprises:
  - a second flexible transmission line; and
  - a third substrate, spaced apart from the first substrate and the second substrate, the third substrate is connected directly to the first substrate by the second flexible transmission line; and
- the at least one distributed millimetre wave antenna radiating element further comprises:
- a second distributed millimetre wave antenna radiating element, arranged on the third substrate,
- wherein the Radio Frequency Integrated Circuit is configured to be connected to at least one of the fixed millimetre wave antenna radiating element or the at least one distributed millimetre wave antenna radiating element, comprises:
- the Radio Frequency Integrated Circuit is configured to be connected to at least one of the fixed millimetre wave antenna radiating element, the first distributed millimetre wave antenna radiating element, or the second distributed millimetre wave antenna radiating element.

11. The communication device according to claim 10, further comprising:
- a switching arrangement, configured to selectively connect the Radio Frequency Integrated Circuit to at least one of the fixed millimetre wave antenna radiating element, the first distributed millimetre wave antenna radiating element or the second distributed millimetre wave antenna radiating element,
- wherein based on the switching arrangement connecting the first distributed millimetre wave antenna radiating element to the Radio Frequency Integrated Circuit, the first distributed millimetre wave antenna radiating element is connected to the Radio Frequency Integrated Circuit by the first flexible transmission line, and wherein based on the switching arrangement connecting the second distributed millimetre wave antenna radiating element to the Radio Frequency Integrated Circuit, the second distributed millimetre wave antenna radiating element is connected to the Radio Frequency Integrated Circuit by the second flexible transmission line.

12. The communication device according to claim 3, wherein the processing unit is configured to control the switching arrangement to connect the first distributed millimetre wave antenna radiating element and disconnect the fixed millimetre wave antenna radiating element when a change of a user scenario is detected.

13. The communication device according to claim 12, wherein the change of the user scenario comprises:

the blocking of the fixed millimetre wave antenna radiating element by a hand or body of a user; and change of an orientation of the fixed millimetre wave antenna radiating element in relation to a base station antenna to which the communication device connects.

14. A method for a communication device, comprising:

providing a housing that comprises a front, a back cover and a surrounding frame which mounts the back cover to the front;

arranging a millimetre wave antenna arrangement, a Radio Frequency Integrated Circuit, a first substrate, a second substrate, and a first flexible transmission line in the housing, wherein the millimetre wave antenna arrangement comprises at least one distributed millimetre wave antenna radiating element and a fixed millimetre wave antenna radiating element, the at least one distributed millimetre wave antenna radiating element comprises a first distributed millimetre wave antenna radiating element; the first substrate is a rigid substrate, the fixed millimetre wave antenna radiating element and the Radio Frequency Integrated Circuit are arranged on the first substrate; the second substrate is spaced apart from the first substrate, and the second substrate is connected directly to the first substrate by the first flexible transmission line, wherein the first distributed millimetre wave antenna radiating element is arranged on the second substrate; and connecting the Radio Frequency Integrated Circuit to at least one of the fixed millimetre wave antenna radiating element or the at least one distributed millimetre wave antenna radiating element.

15. The method according to claim 14, wherein the connecting the Radio Frequency Integrated Circuit to at least one of the fixed millimetre wave antenna radiating element or the at least one distributed millimetre wave antenna radiating element, comprises at least one of the following:

connecting the first distributed millimetre wave antenna radiating element to the Radio Frequency Integrated Circuit; and disconnecting the fixed millimetre wave antenna radiating element from the Radio Frequency Integrated Circuit; or connecting the fixed millimetre wave antenna radiating element to the Radio Frequency Integrated Circuit; and disconnecting the first distributed millimetre wave antenna radiating element from the Radio Frequency Integrated Circuit.

16. The method according to claim 14, wherein the connecting the Radio Frequency Integrated Circuit to at least one of the fixed millimetre wave antenna radiating element or the at least one distributed millimetre wave antenna radiating element comprises:

detecting a change of a user scenario; and disconnecting the fixed millimetre wave antenna radiating element from the Radio Frequency Integrated Circuit while connecting the first distributed millimetre wave antenna radiating element to the Radio Frequency Integrated Circuit.

17. The method according to claim 16, wherein the change of the user scenario comprises:

the blocking of the fixed millimetre wave antenna radiating element by a hand or body of a user; and change of an orientation of the fixed millimetre wave antenna radiating element in relation to a base station antenna to which the communication device connects.

18. The method according to claim 14, wherein the second substrate is not configured with any integrated circuits, and the first flexible transmission line is configured to transmit radio frequency signal between the Radio Frequency Integrated Circuit on the first substrate and the first distributed millimetre wave antenna radiating element on the second substrate.

19. The method according to claim 14, wherein the fixed millimetre wave antenna radiating element and the Radio Frequency Integrated Circuit are fixed on opposite sides of the first substrate, wherein at least part of the fixed millimetre wave antenna radiating element is fixed directly opposite the Radio Frequency Integrated Circuit.

20. The method according to claim 14, wherein the at least one distributed millimetre wave antenna radiating element further comprises a second distributed millimetre wave antenna radiating element; and the method further comprising:

arranging a third substrate, and a second flexible transmission line, wherein the third substrate is spaced apart from the first substrate and the second substrate, and the third substrate is connected directly to the first substrate by the second flexible transmission line, wherein the second distributed millimetre wave antenna radiating element is arranged on the third substrate;

wherein the connecting the Radio Frequency Integrated Circuit to at least one of the fixed millimetre wave antenna radiating element or the at least one distributed millimetre wave antenna radiating element, comprises:

connecting the Radio Frequency Integrated Circuit to one of the fixed millimetre wave antenna radiating element, the first distributed millimetre wave antenna radiating element, and the second distributed millimetre wave antenna radiating element.

21. The method according to claim 14, further comprising:

arranging a switching arrangement, wherein the connecting the Radio Frequency Integrated Circuit to at least one of the fixed millimetre wave antenna radiating element or the at least one distributed millimetre wave antenna radiating element comprises:

selectively connecting, via the switching arrangement, the Radio Frequency Integrated Circuit to at least one of the fixed millimetre wave antenna radiating element or the at least one distributed millimetre wave antenna radiating element.

22. The method according to claim 14, wherein arranging a switching arrangement comprises, arranging the switching arrangement on the first substrate.

23. The method according to claim 14, wherein the first flexible transmission line is configured to transmit radio frequency signal between the Radio Frequency Integrated Circuit arranged on the first substrate and the first distributed millimetre wave antenna radiating element arranged on the second substrate.

* * * * *